United States Patent [19]
Dooley

[11] Patent Number: 5,979,673
[45] Date of Patent: Nov. 9, 1999

[54] MAGNETIC COOKING UTENSIL HOLDER

[76] Inventor: Patricia A. Dooley, 5170 Spring Born Rd., China, Mich. 48054

[21] Appl. No.: 09/059,629

[22] Filed: Apr. 13, 1998

[51] Int. Cl.[6] ..................................................... A47G 19/08
[52] U.S. Cl. ........................................................... 211/41.11
[58] Field of Search .......................... 211/41.11, DIG. 1, 211/70.7; 248/309.4, 37.3, 37.6

[56] References Cited

U.S. PATENT DOCUMENTS

| | | |
|---|---|---|
| 3,212,755 | 10/1965 | Liss et al. . |
| 3,258,237 | 6/1966 | Beiman . |
| 4,586,616 | 5/1986 | Cooper et al. . |
| 5,011,102 | 4/1991 | Kiefer . |
| 5,301,822 | 4/1994 | Coleman et al. . |

*Primary Examiner*—Alvin Chin-Shue
*Assistant Examiner*—Sarah Purol
*Attorney, Agent, or Firm*—Kenneth L. Tolar

[57] ABSTRACT

The present invention relates to a magnetic cooking utensil holder which allows a user to temporarily secure hot pan lids while cooking eliminating the undesirable practice of placing the hot and sometimes soiled lids on a counter top. The device includes a horizontal tubular magnet having a plurality of support legs pivotally attached thereto which expand to form a tripod type support structure. A drip tray for collecting condensate or food residue adhering to the lid is removably attached to a pair of opposing support legs. A pair of opposing side arms each extending from an end of the magnet have a plurality of vertically aligned magnetic strips thereon for receiving additional cooking utensils such as knives, forks and spoons. Accordingly, whenever a user removes a lid to add ingredients or to stir the food within a pot or pan, the edge of the pan is placed within a drip tray with an opposing portion magnetically secured to the magnetic bar. The tripod type support structure allows the lid to be obliquely suspended with respect to the counter top so that any condensation or food residue adhering to the lid will easily drain into the drip tray.

6 Claims, 2 Drawing Sheets

MAGNETIC COOKING UTENSIL HOLDER

BACKGROUND OF THE INVENTION

The present invention relates to a magnetic cooking utensil holder, and more specifically, a tripod type device on which a hot pot or pan lid may be magnetically supported thereby protecting a counter top from condensation, heat and food residue.

DESCRIPTION OF THE PRIOR ART

When cooking with a pot or pan, a user must periodically remove the lid to stir the items therein or to add additional ingredients thereto. The lid is typically very hot and often has splattered food and condensation thereon. A hot lid can cause permanent damage to a counter top, a table or similar support surface if placed thereon. Even if the lid is not extremely hot, condensation and food residue will drip onto the counter top which is messy and inconvenient. Accordingly, there is a need for a device which allows a user to temporarily secure a hot or dirty pan lid eliminating the undesirable practice of placing it on a counter top.

Numerous magnetic cooking utensil holders currently exist in the prior art. However, none have the unique features and advantages of the present invention nor are they specifically designed to temporarily retain a hot or soiled pan lid. For example, U.S. Pat. No. 5,301,822 issued to Coleman discloses a magnetic tool holder comprising a generally elongated body member having a longitudinal channel with a magnet received therein. The device is designed to retain tools such as hammers, wrenches and similar items.

U.S. Pat. No. 5,011,102 issued to Kiefer discloses a magnetic knife holder comprising a plurality of magnets covered by a cowling. The cowling has a curved entry to guide the knife into the magnets.

U.S. Pat. No. 3,258,237 issued to Beiman relates to a detachable supporting means having a magnetic hanger for removably attaching the support means to a wall. The device is designed to magnetically retain small utensils such as a scissors, hand tools, etc.

U.S. Pat. No. 3,212,755 issued to Liss relates to a magnetic guardrail assembly to be used in a medicine cabinet for more securely retaining items on a medicine cabinet shelf.

U.S. Pat. No. 4,586,616 issued to Cooper relates to a magnetic utensil mounting bar comprising an elongated member having a plurality of hooks extending from a side thereof. A magnet is attached to a distal side of the elongated member to allow the device to be removably attached to a metallic appliance such as a refrigerator or stove.

Although various magnetic tool and utensil holders exist in the prior art, none relate to a device specifically configured to obliquely retain a hot pot or pan lid so that any condensation or food residue adhering thereto will drain into a detachable tray. The device further includes a pair of opposing support arms each having a plurality of magnets thereon for receiving additional cooking utensils such as spoons and knives.

SUMMARY OF THE INVENTION

The present invention relates to a cooking utensil holding device for temporarily securing a hot pot or pan lid during the cooking process. The device comprises an elongated tubular magnet having a pair of opposing ends. A pair of substantially parallel support legs are pivotally mounted to the magnet each proximal an end thereof while a third leg pivotally extends from an opposing portion of the magnet providing a tripod type structure for suspending the magnet in a substantially horizontal position. At a distal end of each support leg is a horizontal foot member for resting on a support surface such as a counter top. A drip tray for receiving condensation or splattered food from the lid is removably attached to a pair of opposing support legs by inserting their respective foot portions into a pair of retaining clips. Vertically depending from each end of the magnet is a side arm. A plurality of magnetic strips are vertically disposed on the side arms for magnetically securing additional cooking utensils such as spoons, knives, spatulas, etc.

It is therefore an object of the present invention to provide a cooking utensil holder which can quickly and conveniently secure a hot pot or pan lid.

It is yet another object of the present invention to provide a cooking utensil holder that conveniently collects condensation and food residue draining from the utensil.

It is yet another object of the present invention to provide a cooking utensil holder that prevents a hot lid from burning or damaging a counter top. Other objects, features and advantages of the present invention will become readily apparent from the following detailed description of the preferred embodiment when considered with attached drawings and the appended claims.

DESCRIPTION OF THE PREFERRED EMBODIMENT

Figure 1:
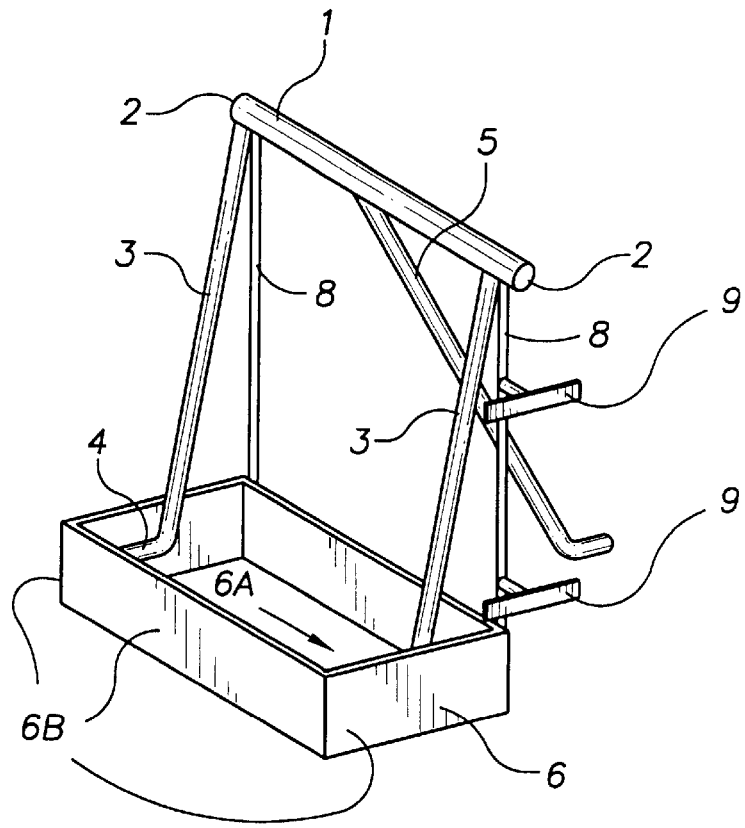
FIG. 1 depicts the inventive device.
Figure 2:
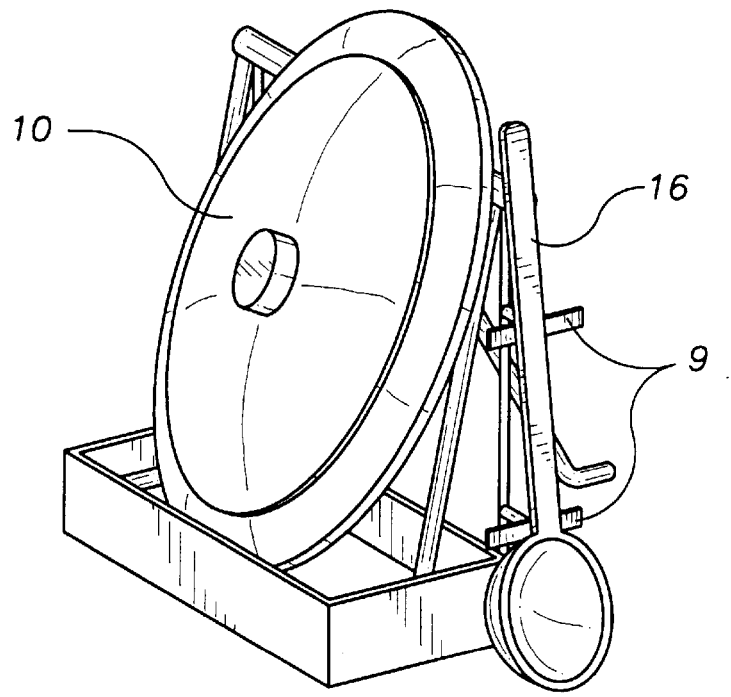
FIG. 2 depicts the inventive device with a lid and a spoon attached thereto.
Figure 3:
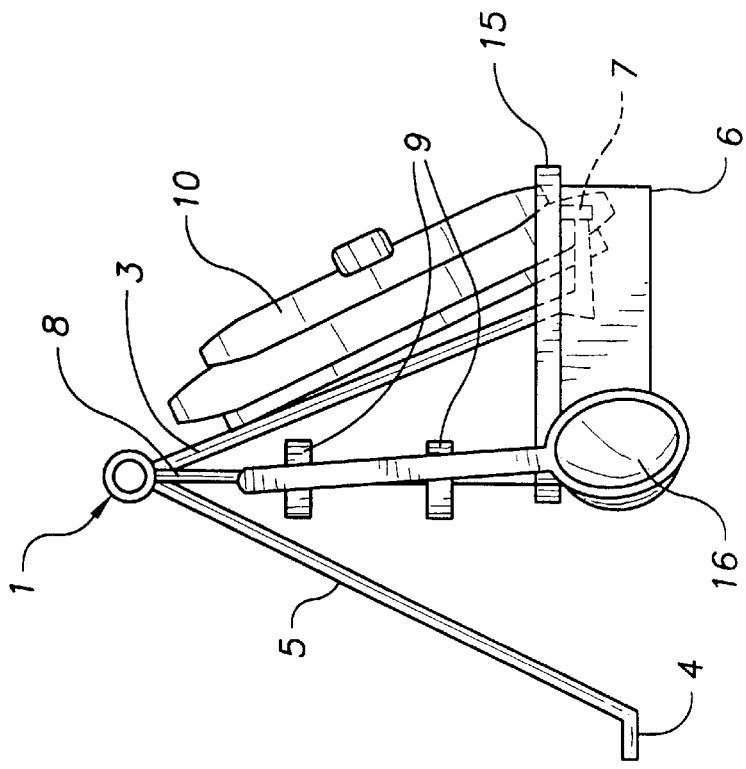
FIG. 3 is a side view of the inventive device.

Referring now to FIGS. 1 through 3, the present invention relates to a device for magnetically securing ferromagnetic pan lids 10 and similar cooking utensils. The device comprises an elongated tubular magnet 1 having two opposed ends 2. Extending from each end is a pivotally engaging support leg 3 each having a horizontal foot portion 4 at a distal end thereof. A third leg 5 also having a horizontal foot portion 4 pivotally engages an intermediate portion of the magnet and extends from an opposing portion thereof. The three support legs 3,5 also form a tripod type structure for horizontally suspending the magnet a predetermined distance above a support surface. The tripod type support structure allows a lid to be obliquely supported with respect to a counter top or similar surface so that any condensation or food residue will easily drain into an accompanying drip pan. The pivotally engaging support legs 3,5 allow the device to be easily collapsed for storage.

Figure 4:
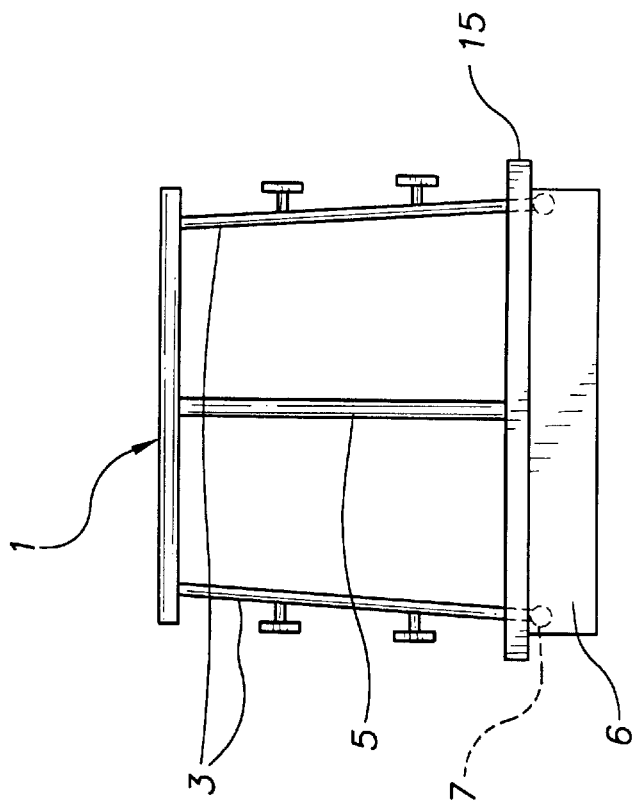
FIG. 4 is a front view of the inventive device.

The present invention also includes a removably attached drip tray 6. The box type drip tray 6 includes a substantially rectangular bottom surface 6A with four sidewalls 6B perpendicularly depending therefrom. Depending from the inner surface of opposing side walls are clips 7 each for receiving a horizontal foot portion a support leg 3. Accordingly, the drip tray 6 may be quickly and easily attached to the support legs 3 by inserting a foot portion into a retaining clip as depicted in FIGS. 3 and 4. The drip tray may also have a ledge 15 on the upper edges of each side wall as depicted in FIGS. 3 and 4.

Extending from the opposing ends of the tubular magnet 1 are a pair of opposing vertical side arms 8 for providing additional structural support to the device. Disposed on each side arm 8 are a plurality of magnetic strips 9 for retaining additional ferromagnetic cooking utensils such as spoons 16, knives, forks, etc.

To use the above described device, a user removes a pot or pan lid 10 and places a portion of the outer edge into the drip tray. An opposing portion of the outer edge is magnetically secured to the tubular magnet. Accordingly, a hot or soiled lid may be temporarily secured without placing it on a counter top where it can cause damage thereto. Other hot metallic items such as stirring spoons, spatulas and carving knives may be likewise attached to the inventive device by securing it to the magnetic strips provided on the side arms.

The above described device is not to be limited to the exact details described above. Preferably, the drip tray is manufactured with stainless steel and the side arms and support legs are preferably constructed with aluminum. However, as will be readily apparent to those skilled in the art, the materials of construction, shape and size of the various components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A cooking utensil holder comprising:

an elongated, tubular magnet for magnetically retaining a ferromagnetic cooking utensil, said magnet having two opposing ends;

a plurality of support legs pivotally attached to said magnet for horizontally suspending said magnet a predetermined distance above a support surface;

a drip tray removably attached to said plurality of support legs for receiving condensation and food residue from said cooking utensil whereby said cooking utensil may be obliquely secured with respect to said support surface with a portion of its outer edge magnetically engaging the magnet while an opposing portion is received within said drip tray.

2. A cooking utensil holder further comprising a side arm vertically depending from each end of the tubular magnet to provide additional support thereto.

3. A cooking utensil holder according to claim 2 further comprising a plurality of magnetic strips on said side arms for magnetically securing a ferromagnetic cooking utensil.

4. A cooking utensil holder according to claim 1 wherein each of said support legs have a horizontal foot portion at a distal end for resting on said support surface.

5. A cooking utensil holder according to claim 4 wherein said drip tray includes a substantially rectangular bottom surface and four side walls upwardly extending therefrom.

6. A cooking utensil holder according to claim 5 wherein said drip tray further comprises a pair of clips each disposed on an opposing side of said drip tray dimensioned to receive said horizontal foot portion of said support leg allowing said drip tray to be detached therefrom.

* * * * *